US012563204B2

(12) United States Patent
Zhao et al.

(10) Patent No.: US 12,563,204 B2
(45) Date of Patent: Feb. 24, 2026

(54) MULTIPLE RESIDUAL BLOCK CODING MODE

(71) Applicant: Tencent America LLC, Palo Alto, CA (US)

(72) Inventors: Xin Zhao, San Jose, CA (US); Liang Zhao, Sunnyvale, CA (US); Han Gao, San Diego, CA (US); Jing Ye, San Jose, CA (US); Tianqi Liu, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 60 days.

(21) Appl. No.: 18/384,308

(22) Filed: Oct. 26, 2023

(65) Prior Publication Data

US 2025/0008122 A1 Jan. 2, 2025

Related U.S. Application Data

(60) Provisional application No. 63/524,549, filed on Jun. 30, 2023.

(51) Int. Cl.
H04N 19/176 (2014.01)
H04N 19/105 (2014.01)
(Continued)

(52) U.S. Cl.
CPC ......... H04N 19/176 (2014.11); H04N 19/105 (2014.11); H04N 19/122 (2014.11); H04N 19/124 (2014.11); H04N 19/13 (2014.11); H04N 19/132 (2014.11); H04N 19/159 (2014.11); H04N 19/172 (2014.11);
(Continued)

(58) Field of Classification Search
CPC .. H04N 19/105; H04N 19/176; H04N 19/124; H04N 19/18; H04N 19/13
See application file for complete search history.

(56) References Cited

U.S. PATENT DOCUMENTS

2013/0077696 A1* 3/2013 Zhou .................... H04N 19/176
                                                375/E7.026
2013/0114675 A1    5/2013 Guo et al.
                    (Continued)

FOREIGN PATENT DOCUMENTS

WO        2023/024712 A1    3/2023

OTHER PUBLICATIONS

International Search Report and Written Opinion issued in PCT/ US2023/078030, mailed Feb. 28, 2024, 10 pages.
(Continued)

*Primary Examiner* — Zhubing Ren
(74) *Attorney, Agent, or Firm* — ArentFox Schiff LLP

(57) ABSTRACT

A video bitstream comprising coded information of a plurality of partial residual blocks of a current block in a current picture is received. Each of the plurality of partial residual blocks indicates a difference between a respective prediction block of the current block and the current block. The plurality of partial residual blocks of the current block is determined based on respective coding parameters. A residual block is determined based on the plurality of partial residual blocks. A prediction block for the current block is determined. The current block is reconstructed based on a combination of the derived residual block and the determined prediction block.

20 Claims, 6 Drawing Sheets

(51) Int. Cl.

| | |
|---|---|
| *H04N 19/122* | (2014.01) |
| *H04N 19/124* | (2014.01) |
| *H04N 19/13* | (2014.01) |
| *H04N 19/132* | (2014.01) |
| *H04N 19/159* | (2014.01) |
| *H04N 19/172* | (2014.01) |
| *H04N 19/18* | (2014.01) |
| *H04N 19/463* | (2014.01) |
| *H04N 19/61* | (2014.01) |

(52) U.S. Cl.
CPC ........... *H04N 19/18* (2014.11); *H04N 19/463* (2014.11); *H04N 19/61* (2014.11)

(56) References Cited

U.S. PATENT DOCUMENTS

| | | | | |
|---|---|---|---|---|
| 2013/0343450 | A1* | 12/2013 | Solka | H04N 19/46 |
| | | | | 375/240.03 |
| 2014/0079128 | A1 | 3/2014 | Kim et al. | |

| | | | | |
|---|---|---|---|---|
| 2014/0098854 | A1* | 4/2014 | Gu | H04N 19/593 |
| | | | | 375/240.03 |
| 2018/0035111 | A1* | 2/2018 | Oh | H04N 19/124 |
| 2019/0045198 | A1* | 2/2019 | Mahdi | H04N 19/103 |
| 2020/0092555 | A1* | 3/2020 | Zhao | H04N 19/12 |
| 2021/0176464 | A1 | 6/2021 | Ray et al. | |
| 2021/0243455 | A1* | 8/2021 | Rapaka | H04N 19/119 |
| 2022/0086449 | A1 | 3/2022 | Koo et al. | |
| 2022/0210434 | A1 | 6/2022 | Wang et al. | |
| 2022/0321886 | A1 | 10/2022 | Schwarz et al. | |
| 2022/0353538 | A1* | 11/2022 | Chen | H04N 19/70 |
| 2023/0100043 | A1 | 3/2023 | Peringassery Krishnan et al. | |

OTHER PUBLICATIONS

International Search Report and Written Opinion received for PCT Patent Application No. PCT/US2024/032072, mailed on Aug. 21, 2024, 17 pages.

* cited by examiner

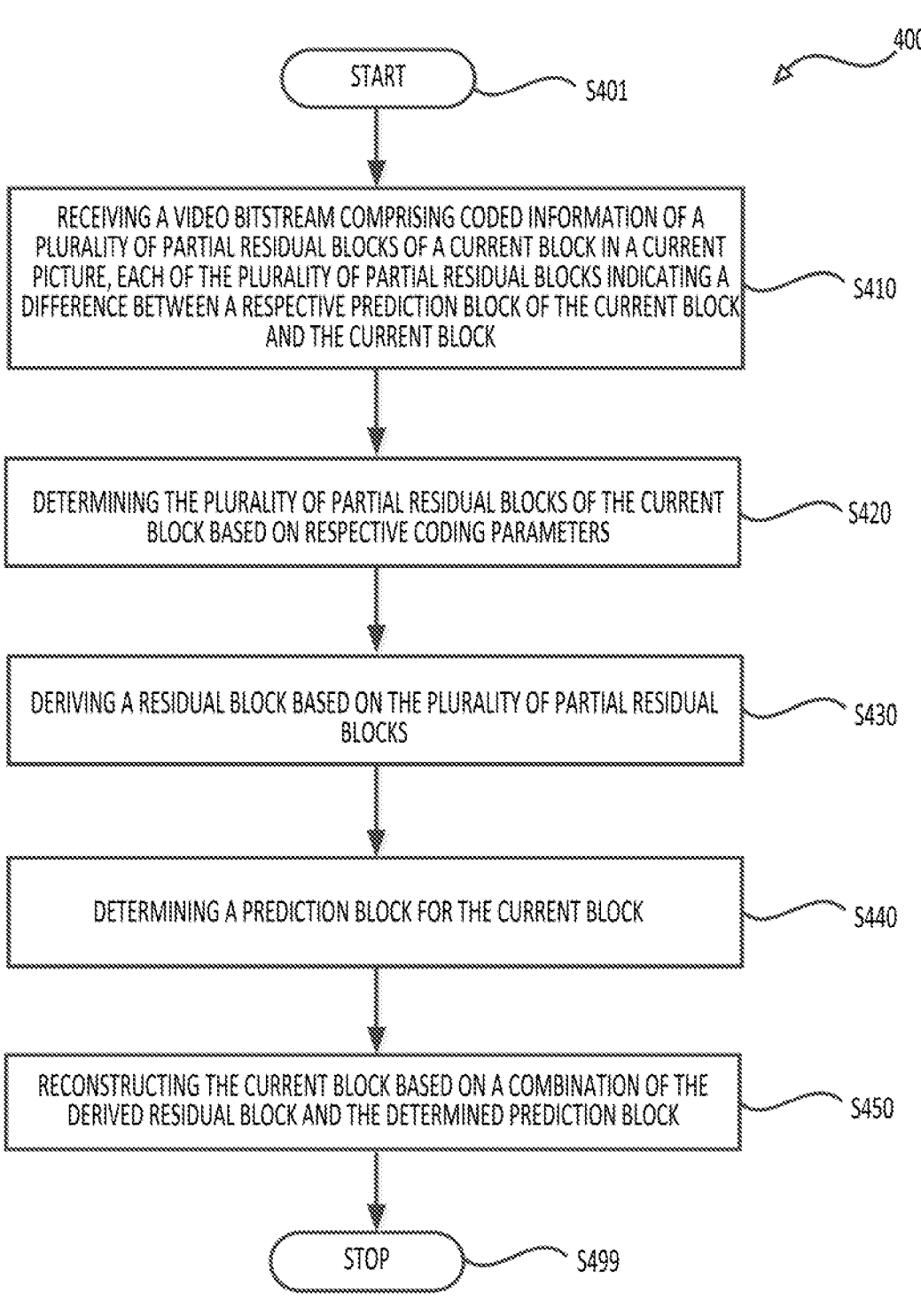

400

START — S401

RECEIVING A VIDEO BITSTREAM COMPRISING CODED INFORMATION OF A PLURALITY OF PARTIAL RESIDUAL BLOCKS OF A CURRENT BLOCK IN A CURRENT PICTURE, EACH OF THE PLURALITY OF PARTIAL RESIDUAL BLOCKS INDICATING A DIFFERENCE BETWEEN A RESPECTIVE PREDICTION BLOCK OF THE CURRENT BLOCK AND THE CURRENT BLOCK — S410

DETERMINING THE PLURALITY OF PARTIAL RESIDUAL BLOCKS OF THE CURRENT BLOCK BASED ON RESPECTIVE CODING PARAMETERS — S420

DERIVING A RESIDUAL BLOCK BASED ON THE PLURALITY OF PARTIAL RESIDUAL BLOCKS — S430

DETERMINING A PREDICTION BLOCK FOR THE CURRENT BLOCK — S440

RECONSTRUCTING THE CURRENT BLOCK BASED ON A COMBINATION OF THE DERIVED RESIDUAL BLOCK AND THE DETERMINED PREDICTION BLOCK — S450

STOP — S499

FIG. 4

MULTIPLE RESIDUAL BLOCK CODING MODE

INCORPORATION BY REFERENCE

The present application claims the benefit of priority to U.S. Provisional Application No. 63/524,549, "Multiple Residual Block Coding Mode" filed on Jun. 30, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding is provided. In the method, a video bitstream comprising coded information of a plurality of partial residual blocks of a current block in a current picture is received. Each of the plurality of partial residual blocks indicates a difference between a respective prediction block of the current block and the current block. The plurality of partial residual blocks of the current block is determined based on respective coding parameters. A residual block is determined based on the plurality of partial residual blocks. A prediction block for the current block is determined. The current block is reconstructed based on a combination of the derived residual block and the determined prediction block.

In an aspect, the plurality of partial residual blocks includes (i) a first partial residual block that is determined based on a difference between a first prediction block of the current block and the current block, and (ii) a second partial residual block that is determined based on a difference between a first reconstruction block of the current block and the current block, where the first reconstruction block is determined based on the first partial residual block.

In an example, the coded information of the plurality of partial residual blocks of the current block is entropy decoded to obtain quantized transform coefficients associated with each of the plurality of partial residual blocks based on the respective coding parameters. The respective coding parameters include at least one of a binarization, a coefficient scanning order, and a context model of the respective partial residual block.

In an example, the quantized transform coefficients associated with each of the plurality of partial residual blocks are dequantized to obtain transform coefficients associated with the respective partial residual block based on the respective coding parameters. The respective coding parameters include a respective quantization step size of the respective partial residual block.

In an example, a quantization step size of the quantized transform coefficients associated with at least one of the plurality of partial residual blocks is equal to 1.

In an example, the transform coefficients associated with each of the plurality of partial residual blocks are inversely transformed to obtain the plurality of partial residual blocks based on the respective coding parameters that include respective transform kernels.

In an example, at least one of the multiple partial residual blocks is inversely transformed based on an identity transform.

In an example, a size of a first partial residual block of the plurality of partial residual blocks is equal to the size of the current block, and a size of a second partial residual block of the plurality of partial residual blocks is smaller than the size of the current block.

In an example, at least one of the plurality of partial residual blocks is coded by a lossy coding mode. In an example, at most one of the plurality of partial residual blocks is coded by a lossless coding mode.

In an example, the coded information further indicates a number of the plurality of partial residual blocks and which of the plurality of partial residual blocks is coded by a lossless coding mode.

In an example, a reference block for another block in the current picture is determined, where the reference block for the other block includes reconstruction samples that are determined based on a subset of the plurality of partial residual blocks.

In an example, a first reconstruction block of the current block is determined based on a first subset of the plurality of partial residual blocks that is coded by a lossy coding mode and the prediction block. A second reconstruction block of the current block is determined based on a second subset of the plurality of partial residual blocks that is coded by a lossless coding mode and the prediction block. In an example, a reconstruction block of the current block is determined based on the first reconstruction block and the second reconstruction block. For example, the reconstruction block of the current block is a weighted sum of the first reconstruction block and the second reconstruction block.

In an example, a first reference block is determined for a first block in the current picture based on a first subset of the plurality of partial residual blocks and a second reference block is determined for a second block in another picture based on a second subset of the plurality of partial residual blocks. The first subset of the plurality of partial residual blocks is different from the second subset of the plurality of partial residual blocks.

According to another aspect of the disclosure, an apparatus is provided. The apparatus includes processing circuitry. The processing circuitry can be configured to perform any of the described methods for video decoding/encoding. For example, the processing circuitry is configured to receive a video bitstream comprising coded information of a plurality of partial residual blocks of a current block in a current picture, where each of the plurality of partial residual blocks indicates a difference between a respective prediction block of the current block and the current block. The processing circuitry is configured to determine the plurality of partial residual blocks of the current block based on respective coding parameters. The processing circuitry is configured to derive a residual block based on the plurality of partial residual blocks. The processing circuitry is configured to determine a prediction block for the current block. The processing circuitry is configured to reconstruct the current block based on a combination of the derived residual block and the determined prediction block.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 4 shows a flow chart outlining a decoding process according to some embodiments of the disclosure.

DETAILED DESCRIPTION OF EMBODIMENTS

Figure 1:
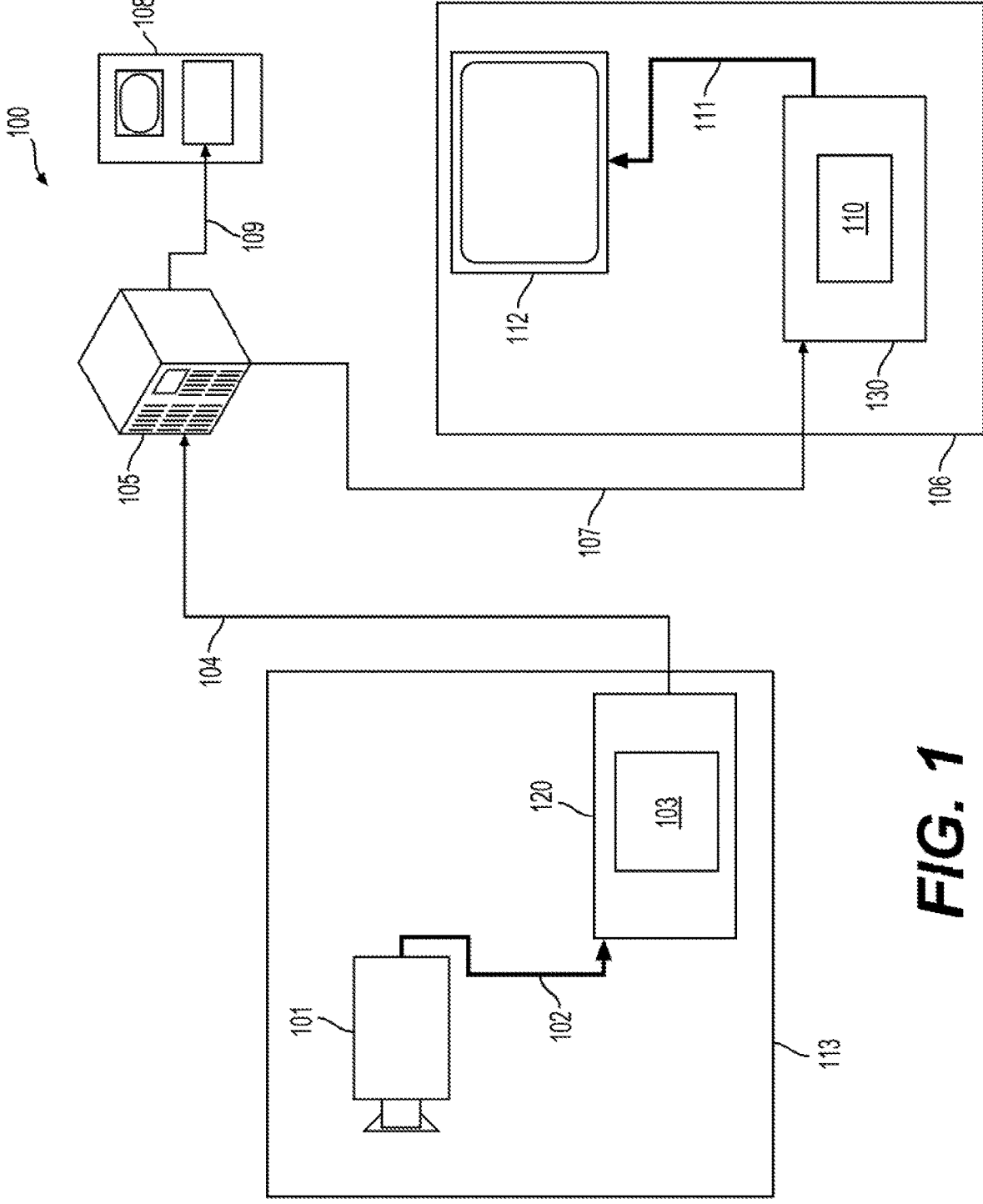
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
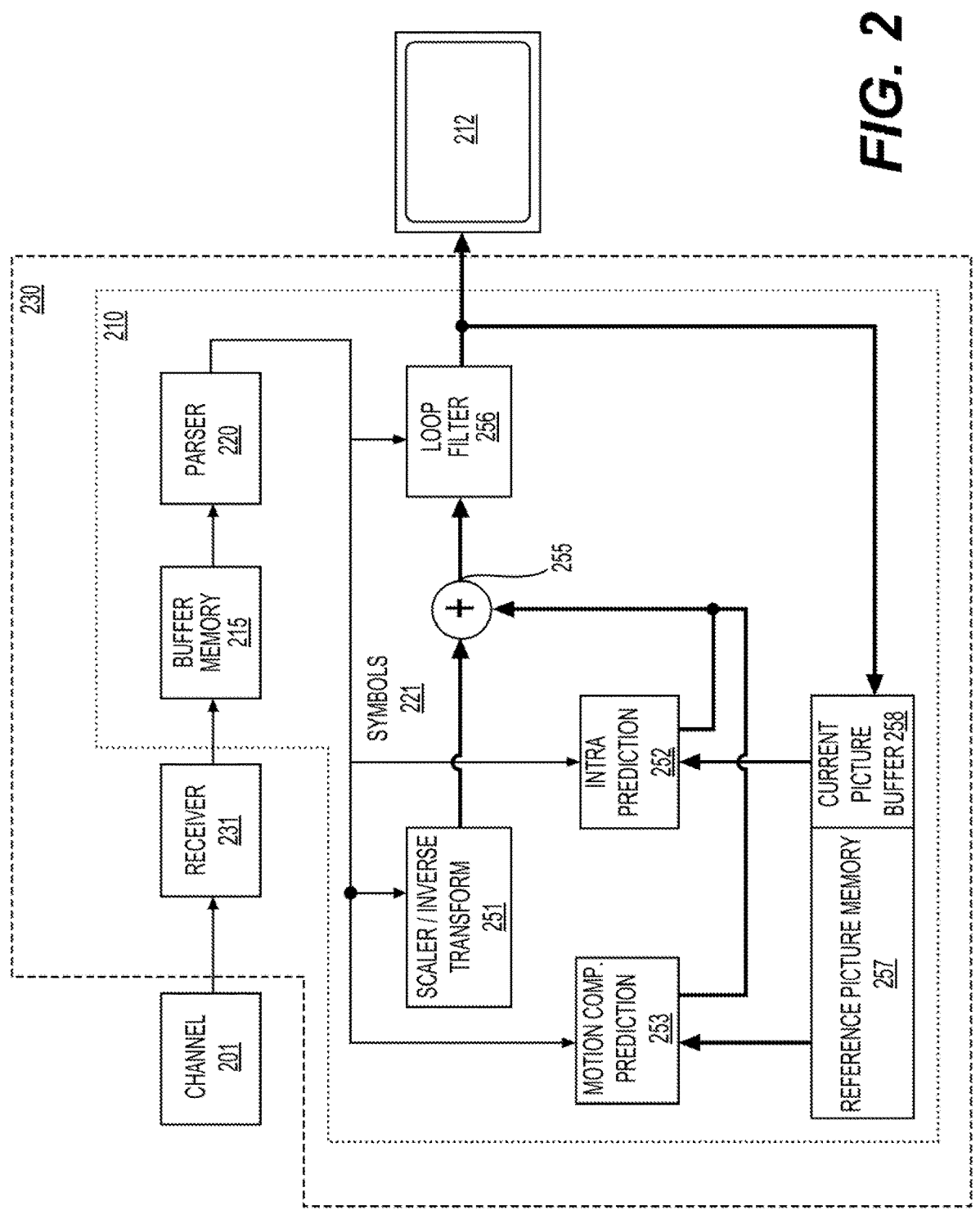
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
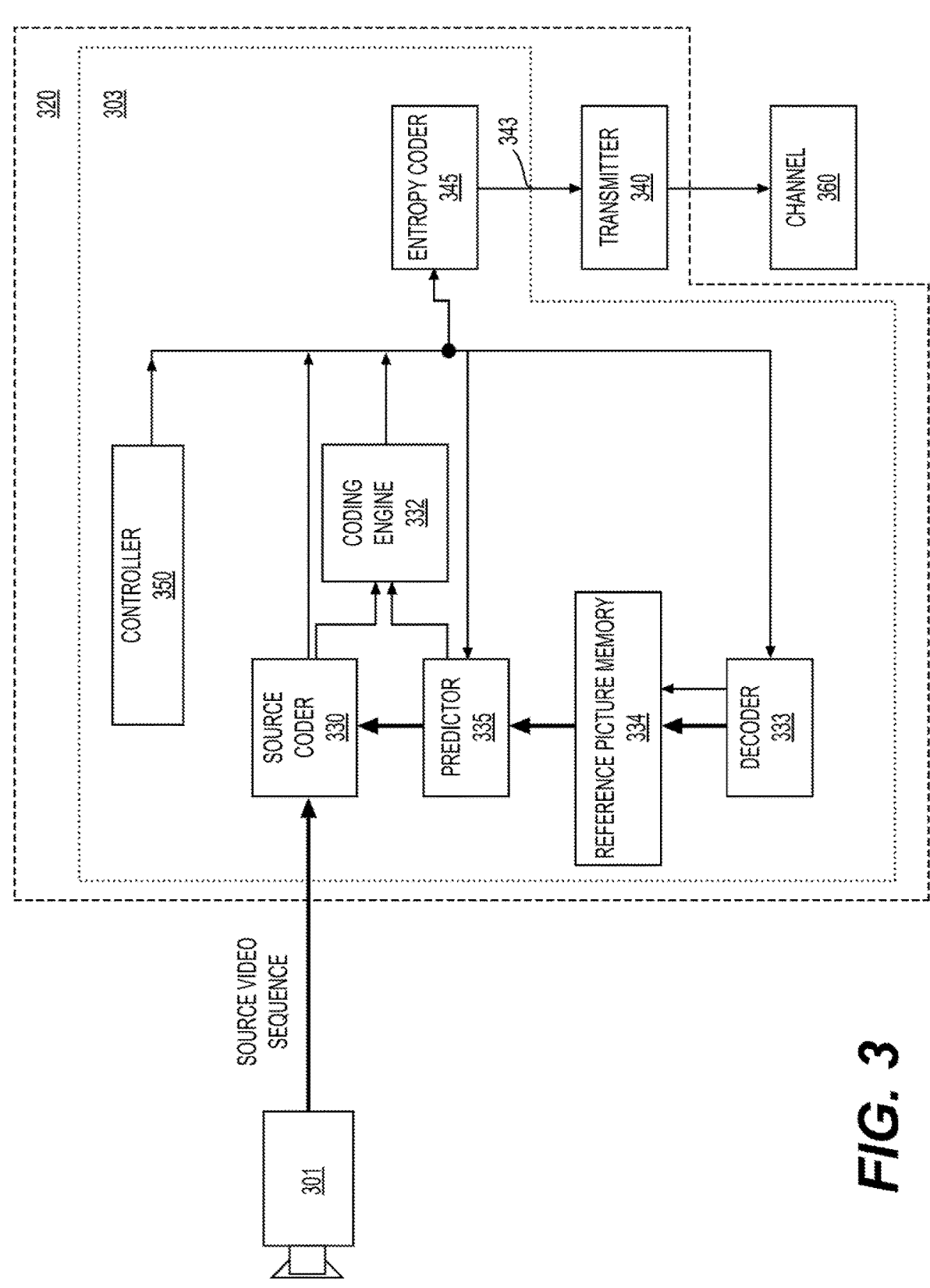
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to video and/or image compression. For example, a block of a video can be reconstructed based on one or more residual blocks.

Video coding has been widely used in many applications. Exemplary adopted video coding standards (or codecs) can include H.264, H.265 (or HEVC), H.266 (or VVC), AV1, and AVS/AVS2/AVS3. A video codec can generally include several modules, such as intra and/or inter prediction, transform coding, quantization, residual coding, in-loop filtering, or the like. As one of the main modules in the video codec, various residual coding technologies have been provided to code prediction residual samples of a block into a bitstream using entropy coding.

In a video coding process, an encoder can form a prediction of a block based on previously coded data, either from a current frame (e.g., an intra prediction) or from other frames that have already been coded and transmitted (e.g., an inter prediction). The encoder can subtract the prediction from the current block to form a residual block.

Residual samples in the residual block can be transformed by a transform algorithm, such as a discrete cosine transform (DCT). The transform can output a set of coefficients (or transform coefficients), where each of the set of coefficients can be a weighting value for a standard basis pattern. When combined, the weighted basis patterns can recreate a block of residual samples.

The output of the transform, such as a block of transform coefficients, can be quantized. For example, each coefficient can be divided by an integer value. Quantization can reduce precision of the transform coefficients according to a quantization parameter (QP). In an example, a result of the quantization can be a block in which most of or all the coefficients are zero, with a few non-zero coefficients. Setting QP to a high value can indicate that more coefficients are set to zero, resulting in a high compression at an expense of poor decoded image quality. Setting QP to a low value can indicate that more non-zero coefficients remain after quantization, resulting in a better decoded image quality but a lower compression.

The video coding process can produce a plurality of values that need be encoded to form a compressed bitstream. These values can include quantized transform coefficients, information to enable a decoder to recreate the prediction, information about a structure of the compressed data and compression tools used during encoding, and information about a complete video sequence. These values and parameters (e.g., syntax elements) can be converted into binary codes using variable length coding and/or arithmetic coding. Each of these encoding methods (e.g., entropy encoding) can produce an efficient, compact binary representation of the information. The encoded bitstream can then be stored and/or transmitted.

In a video decoding process, a video decoder can receive the compressed bitstream, decode each of the syntax elements, and extract coded information, such as the information described above (e.g., quantized transform coefficients, prediction information, etc.). The extracted information can then be used to reverse the coding process and recreate a sequence of video images.

To decode the compressed bitstream, the decoder can entropy decode the compressed bitstream to extract the quantized transform coefficients. The quantized transform coefficients can be rescaled (or dequantized). For example, each coefficient can be multiplied by an integer value to restore a respective original scale. An inverse transform can be applied to inversely transform the transform coefficients into residual data. For example, the inverse transform can combine a standard basis pattern, weighted by the rescaled coefficients, to recreate the residual block. Further, the decoder can add the prediction of the block to the residual block to reconstruct the block.

Lossy compression (or lossy mode) can be a process that reduces a file by permanently eliminating some of original data. For example, in the case of loss compression, only an approximation of the original data may be reconstructed. Thus, certain information of the file can be removed due to the lossy compression. Lossy compression algorithms can reduce a file size considerably, but the image quality may also degrade. Exemplary lossy codecs include H.265/ HEVC, MPEG4, H.264, H.266/VVC, AVC, or the like.

Unlike the lossy compression, lossless compression (or lossless mode) may not reduce the image quality because the lossless compression may only remove additional, non-essential data (e.g., metadata). For example, in the case of lossless compression, original data (e.g., picture data) can be reconstructed from compressed data without loss of information. With lossless compression, information originally in a file can remain after the file is uncompressed, and all the information can be restored. Based on the lossless compression, a size of an image file may not be significantly reduced, and an image quality of the image file may not be affected. However, based on the lossless compression, a storage space may not be saved.

Algorithms used in lossy compression can include transform coding, discrete cosine transform, discrete wavelet transform, fractal compression, or the like. Algorithms used in lossless compression can include run length encoding, Lempel-Ziv-Welch, Huffman coding, arithmetic encoding, or the like.

Versatile Video Coding (VVC), also known as H.266, is a video compression standard that offers improved compression efficiency compared to its predecessors, such as H.265 (HEVC) and H.264 (AVC). In VVC, both lossless and lossy compression techniques can be used to reduce a size of video data for storage or transmission while maintaining a best possible quality.

Lossless compression can be a technique used in VVC where an original video data can be perfectly reconstructed from a compressed data. The lossless compression can indicate no loss of information or quality during the compression process. In VVC, lossless compression techniques can typically be used for an intra-frame coding, where each frame is compressed independently without using information from other frames.

Lossy compression, on the other hand, is a technique where some information is lost during the compression process, leading to a reduction in video quality. However, the loss in quality may often be negligible, and a compression ratio can be significantly higher than lossless compression. VVC can use lossy compression techniques to achieve higher compression efficiency by exploiting redundancies and similarities between frames.

In a related lossless coding scheme, a lossy transform cannot be applied although the lossy transform can provide a significant compression ratio.

The current disclosure includes methods to utilize a lossy transform to achieve a better compression ratio and a lossless reconstruction at the same time. The methods of the disclosure can be used in any codecs, such as H.264, H.265/HEVC, H.266/VVC, AV1, and AVS/AVS2/AVS3.

In the disclosure, to reconstruct a block (or a current block), multiple (e.g., more than one) partial residual blocks can be coded, and the multiple partial residual blocks can be used to derive a residual block, which can be referred to as a final residual block. The final residual block can be added to a prediction block of the current block to derive a reconstruction block of the current block. In an example, each of the multiple partial residual blocks can indicate a difference between the current block and a respective prediction block. In an example, the final residual block can be a combination, such as a weighted combination, of the multiple partial residual blocks. In an example, the multiple partial residual blocks can include a first partial residual block and a second partial residual block. The first partial residual block can be obtained based on a first prediction block and coded by a lossy mode. The second partial residual block can be obtained based on a second prediction block.

In an example, at a decoder side, a video bitstream comprising coded information of a plurality of partial residual blocks of a current block in a current picture can be received. Each of the plurality of partial residual blocks can indicate a difference between a respective prediction block of the current block and the current block. The plurality of partial residual blocks of the current block can be determined based on respective coding parameters. For example, the plurality of partial residual blocks of the current block can be determined based on at least one of respective entropy decoding parameters, respective dequantization parameters, or respective inverse transform parameters. A residual block (or final residual block) can be determined based on the plurality of partial residual blocks. For example, the residual block (or final residual block) can be determined as a weighted sum of the plurality of partial residual blocks. A prediction block for the current block can be determined. The current block can be reconstructed based on a combination of the derived residual block and the determined prediction block.

In an example, at least one of the plurality of partial residual blocks is coded by a lossy coding mode. In an example, at most one of the plurality of partial residual blocks is coded by a lossless coding mode.

In an example, the multiple partial residual blocks can include a first partial residual block and a second partial residual block. The first partial residual block can be coded by a lossy mode and determined as a difference between a first prediction block of the current block and the current block. The second partial residual block can be coded by a lossy mode or a lossless mode. The second partial residual block can be determined as a difference between a first reconstruction block of the current block and the current block. The first reconstruction block can be determined based on the first partial residual block.

In an aspect, a final residual block can be derived as a sum or a weighted sum of multiple partial residual blocks in either a frequency domain or a spatial domain.

In an aspect, different quantization methods can be applied to the multiple partial residual blocks. A quantization method can include any parameter or operation that is involved in quantization of the multiple partial residual blocks. The quantization method can be applied in a quantization process at the encoder, or a dequantization process at the encoder and/or a decoder.

In an aspect, different quantization step sizes (or coding parameters) can be applied for the multiple partial residual blocks. In an aspect, the quantization may not be applied to, or a quantization step size of 1 can be applied to, at least one of the multiple partial residual blocks.

In an example, at a decoder side, quantized transform coefficients associated with each of the plurality of partial residual blocks can be dequantized to obtain transform coefficients associated with the respective partial residual block based on a respective quantization step size of the respective partial residual block. In an example, a quantization step size of the quantized transform coefficients associated with at least one of the plurality of partial residual blocks can be equal to 1.

In an aspect, different transform coding methods can be applied for the multiple partial residual blocks. A transform coding method can refer to any parameter or operation that is involved in a transform process. The transform coding method can be applied in a forward transform process at an encoder, or an inverse transform process at the encoder and/or a decoder.

In an aspect, different transform kernels (or coding parameters) can be applied for the multiple partial residual blocks. In an aspect, a transform may not be applied (or a transform kernel is an identity transform) for at least one of the multiple partial residual blocks. In an aspect, the identity transform can refer to a transform process in which an input and an output are identical or scaled at a same scaled version.

In an example, at a decoder side, transform coefficients associated with each of the plurality of partial residual blocks can be inversely transformed to obtain the plurality of partial residual blocks based on respective transform kernels. In an example, at least one of the multiple partial residual blocks can be inversely transformed based on an identity transform.

In an aspect, different entropy coding methods can be applied for the multiple partial residual blocks. An entropy coding method of the different entropy coding methods can refer to any parameter or any operation that is involved in the entropy coding. The entropy coding method can be applied at an encoder which can convert residual samples (or transform coefficients) into entropy coded bins, or a parsing process at a decoder which can convert entropy coded bins back to residual samples (or transform coefficients).

In the disclosure, different entropy coding/decoding parameters can be applied to the multiple partial residual blocks. In an aspect, different binarizations (e.g., a syntax value to a symbol value) can be applied for the multiple partial residual blocks in the entropy coding. In an aspect, different coefficient (or residual) scanning orders can be applied for the multiple partial residual blocks in the entropy coding. In an aspect, different contexts can be applied for the coefficients (or residuals) of the multiple partial residual blocks in the entropy coding.

For example, at a decoder side, coded information of the plurality of partial residual blocks of the current block received in a bitstream can be entropy decoded to obtain quantized transform coefficients associated with each of the plurality of partial residual blocks based on at least one of a binarization, a coefficient scanning order, and a context model of the respective partial residual block.

In an aspect, more than one of the multiple partial residual blocks can be coded by a lossless coding mode and only one of the multiple partial residual blocks may be coded by a lossy coding mode. For example, a first subset (e.g., more than one) of the multiple partial residual blocks can be coded by a lossless coding mode and a second subset (e.g., one) of the multiple partial residual blocks can be coded by a lossy coding mode.

In an example, to reconstruct a current block, only one of the multiple partial residual blocks is coded by a lossless coding mode. For example, if a first partial residual block of the multiple partial residual blocks is coded by a lossy mode, a second partial residual block of the multiple partial residual blocks can also be applied to reconstruct the current block. If the second partial residual block is coded by a lossless mode, the current block can be reconstructed by a weighted sum of the first and second partial residual blocks, and the multiple partial residual blocks may only include the first and second partial residual blocks.

In an aspect, N partial residual blocks (e.g., more than one) of the multiple partial residual blocks can be coded for a lossless coding mode. For a lossy coding mode, at least one and less than N partial residual blocks of the multiple partial residual blocks can be coded. N can be a positive integer that is larger than 2.

In an example, more than one of the plurality of partial residual blocks can be coded in respective lossless coding modes. In an example, at least one of the plurality of partial residual blocks can be coded by a lossy coding mode.

In an aspect, block sizes of the multiple partial residual blocks can be different. In an aspect, a block size of at least one of the multiple partial residual blocks can be the same as a block size of the current coded block. In an aspect, a block size of at least one partial residual block of the multiple partial residual blocks can be smaller than the block size of the current coded block. In an aspect, a block width and/or a height of one of the multiple partial residual blocks can be a half of a block width and/or a height of the current coded block.

In an aspect, coded information may indicate whether multiple partial residual blocks are coded. In an example, a flag can be signaled to indicate whether one or multiple partial residual blocks are coded. The flag can indicate how many partial residual blocks are applied to reconstruct a current block.

In an example, at a decoder side, coded information (e.g., a flag) can be received. The coded information can indicate a number of the plurality of partial residual blocks and which of the plurality of partial residual blocks is coded by a lossless coding mode.

In an aspect, the flag can be signaled in a sequence level, a frame level, a slice level, a super block, a coded tree unit, or a coded block level. In an aspect, the flag can indicate which one of the multiple partial residual blocks is coded by the lossless mode. For example, if a current coding mode is a lossless mode, then a value of the flag can be 2.

In an aspect, multiple reconstruction blocks may be generated for the current block using different partial residual blocks.

In an example, at a decoder side, a first intermediate reconstruction block of the current block can be determined based on a first subset of the plurality of partial residual blocks that is coded by the lossy coding mode. A second intermediate reconstruction block of the current block can be determined based on a second subset of the plurality of partial residual blocks that is coded by a lossless coding mode. A reconstruction block of the current block can be determined based on the first intermediate reconstruction block and the second intermediate reconstruction block, such as based on a weighted sum of the first intermediate reconstruction block and the second intermediate reconstruction block.

In an aspect, reconstruction samples used as reference samples of another block and reconstruction samples used for display (or for further loop filtering) of a current block can be different.

In an example, reconstruction samples for a current block can be based on a weighted sum of the multiple partial residual blocks, and reconstruction samples used as reference samples for a to-be-reconstructed block can be based on one or a subset of the multiple partial residual blocks.

In an aspect, one reconstruction block can be derived using a partial residual block associated with a lossy quantization/dequantization process, and another reconstruction block can be derived using other partial residual blocks, for example all other partial residual blocks, which can provide lossless reconstruction of the current block.

In an example, at a decoder side, a first reconstruction block of the current block can be determined based on a first subset of the plurality of partial residual blocks that is coded by the lossy coding mode. A second reconstruction block of the current block can be determined based on a second subset of the plurality of partial residual blocks that is coded by a lossless coding mode. A reconstruction block of the current block can be determined based on the first reconstruction block and the second reconstruction block, such as based on a weighted sum of the first reconstruction block and the second reconstruction block.

In an aspect, the multiple partial residual blocks can be added (e.g., a sum or a weighted sum) to form a reconstruction block of a current block.

In an aspect, reconstruction sample used as reference samples of another block in a same picture can be different from reconstruction samples used as reference samples of another block in a different picture.

In an example, a first reference block can be determined for a first block in the current picture based on a first subset of the plurality of partial residual blocks and a second reference block can be determined for a second block in another picture based on a second subset of the plurality of partial residual blocks. The first subset of the plurality of partial residual blocks can be different from the second subset of the plurality of partial residual blocks. For example, at least one partial residual block in the first subset may not be included in the second subset.

FIG. 4 shows a flow chart outlining a process (400) according to an embodiment of the disclosure. The process (400) can be used in a video decoder. In various embodiments, the process (400) is executed by processing circuitry, such as the processing circuitry that performs functions of the video decoder (110), the processing circuitry that performs functions of the video decoder (210), and the like. In some embodiments, the process (400) is implemented in software instructions, thus when the processing circuitry executes the software instructions, the processing circuitry performs the process (400). The process starts at (S401) and proceeds to (S410).

At (S410), a video bitstream comprising coded information of a plurality of partial residual blocks of a current block in a current picture is received. Each of the plurality of partial residual blocks indicates a difference between a respective prediction block of the current block and the current block.

At (S420), the plurality of partial residual blocks of the current block is determined based on respective coding parameters.

At (S430), a residual block is derived based on the plurality of partial residual blocks.

At (S440), a prediction block is determined for the current block.

At (S450), the current block is reconstructed based on a combination of the derived residual block and the determined prediction block.

In an aspect, the plurality of partial residual blocks includes (i) a first partial residual block that is determined based on a difference between a first prediction block of the current block and the current block, and (ii) a second partial residual block that is determined based on a difference between a first reconstruction block of the current block and the current block, where the first reconstruction block is determined based on the first partial residual block.

In an example, the coded information of the plurality of partial residual blocks of the current block is entropy decoded to obtain quantized transform coefficients associated with each of the plurality of partial residual blocks based on the respective coding parameters. The respective coding parameters include at least one of a binarization, a coefficient scanning order, and a context model of the respective partial residual block.

In an example, the quantized transform coefficients associated with each of the plurality of partial residual blocks are dequantized to obtain transform coefficients associated with the respective partial residual block based on the respective coding parameters. The respective coding parameters include a respective quantization step size of the respective partial residual block.

In an example, a quantization step size of the quantized transform coefficients associated with at least one of the plurality of partial residual blocks is equal to 1.

In an example, the transform coefficients associated with each of the plurality of partial residual blocks are inversely transformed to obtain the plurality of partial residual blocks based on the respective coding parameters that include respective transform kernels.

In an example, at least one of the multiple partial residual blocks is inversely transformed based on an identity transform.

In an example, a size of a first partial residual block of the plurality of partial residual blocks is equal to the size of the current block, and a size of a second partial residual block of the plurality of partial residual blocks is smaller than the size of the current block.

In an example, at least one of the plurality of partial residual blocks is coded by a lossy coding mode. In an example, at most one of the plurality of partial residual blocks is coded by a lossless coding mode.

In an example, the coded information further indicates a number of the plurality of partial residual blocks and which of the plurality of partial residual blocks is coded by a lossless coding mode.

In an example, a reference block for another block in the current picture is determined, where the reference block for the other block includes reconstruction samples that are determined based on a subset of the plurality of partial residual blocks.

In an example, a first reconstruction block of the current block is determined based on a first subset of the plurality of partial residual blocks that is coded by a lossy coding mode and the prediction block. A second reconstruction block of the current block is determined based on a second subset of the plurality of partial residual blocks that is coded by a lossless coding mode and the prediction block. In an example, a reconstruction block of the current block is determined based on the first reconstruction block and the second reconstruction block. For example, the reconstruction block of the current block is a weighted sum of the first reconstruction block and the second reconstruction block.

In an example, a first reference block is determined for a first block in the current picture based on a first subset of the plurality of partial residual blocks and a second reference block is determined for a second block in another picture based on a second subset of the plurality of partial residual blocks. The first subset of the plurality of partial residual blocks is different from the second subset of the plurality of partial residual blocks.

Then, the process proceeds to (S499) and terminates.

The process (400) can be suitably adapted. Step(s) in the process (400) can be modified and/or omitted. Additional step(s) can be added. Any suitable order of implementation can be used.

Figure 5:
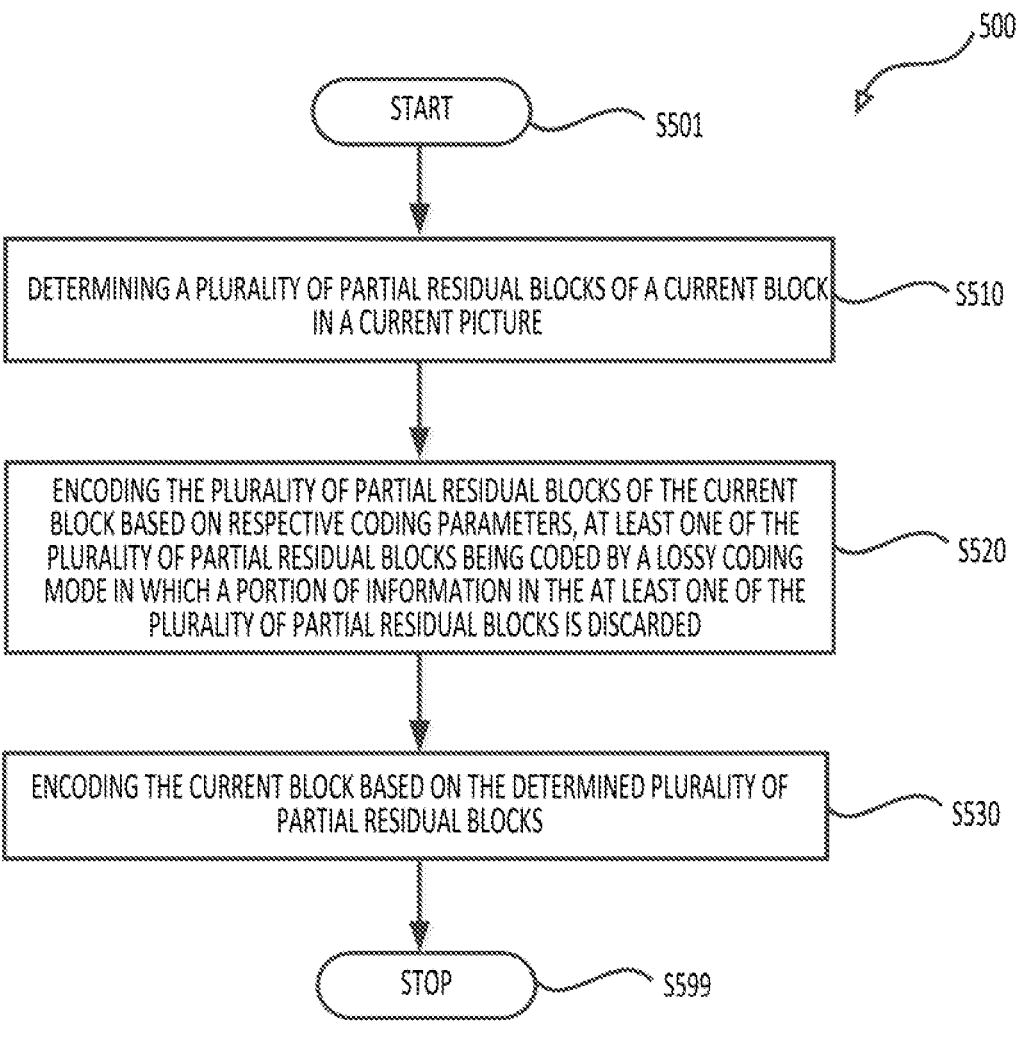
FIG. 5 shows a flow chart outlining an encoding process according to some embodiments of the disclosure.

FIG. 5 shows a flow chart outlining a process (500) according to an embodiment of the disclosure. The process (500) can be used in a video encoder. In various embodiments, the process (500) is executed by processing circuitry, such as the processing circuitry that performs functions of the video encoder (103), the processing circuitry that performs functions of the video encoder (303), and the like. In some embodiments, the process (500) is implemented in software instructions, thus when the processing circuitry executes the software instructions, the processing circuitry performs the process (500). The process starts at (S501) and proceeds to (S510).

At (S510), a plurality of partial residual blocks of a current block in a current picture is determined.

At (S520), the plurality of partial residual blocks of the current block is encoded based on respective coding parameters. The least one of the plurality of partial residual blocks is coded by a lossy coding mode in which a portion of information in the at least one of the plurality of partial residual blocks is discarded.

At (S530), the current block is encoded based on the determined plurality of partial residual blocks.

Then, the process proceeds to (S599) and terminates.

The process (500) can be suitably adapted. Step(s) in the process (500) can be modified and/or omitted. Additional step(s) can be added. Any suitable order of implementation can be used.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
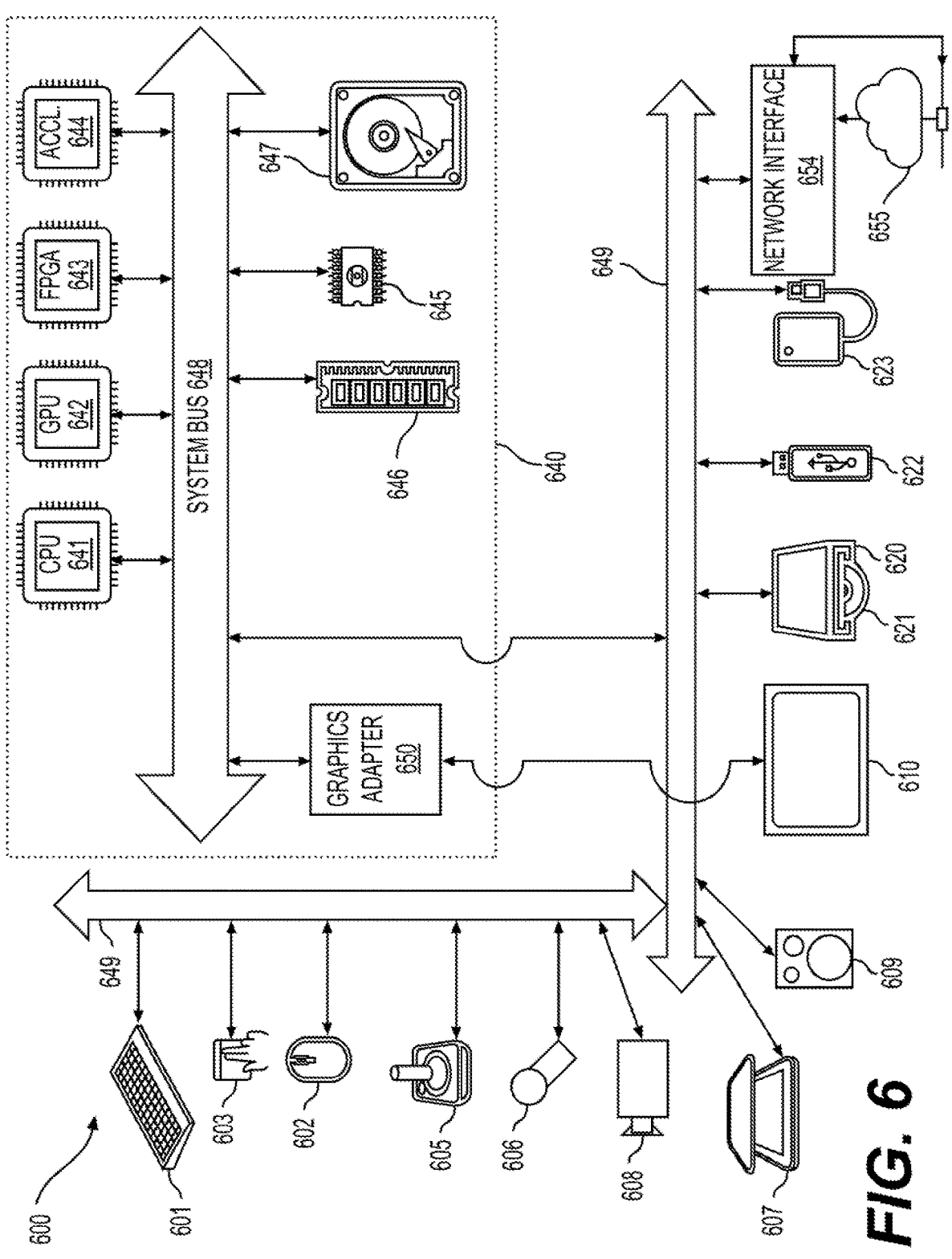
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
receiving a video bitstream comprising coded information of a plurality of partial residual blocks of a current block in a current picture, each of the plurality of partial residual blocks indicating a difference between a respective prediction block of the current block and the current block;
determining the plurality of partial residual blocks of the current block based on respective coding parameters;
deriving a residual block based on the plurality of partial residual blocks;
determining a prediction block for the current block; and
reconstructing the current block based on a combination of the derived residual block and the determined prediction block, wherein:
(i) a first one of the plurality of partial residual blocks is coded by a lossy coding mode,
(ii) a size of at least one of the plurality of partial residual blocks is equal to a size of the current block, and
(iii) when the plurality of partial residual blocks includes a partial residual block that is coded by a lossless coding mode, only the partial residual block of the plurality of partial residual blocks is coded by the lossless coding mode.

2. The method of claim 1, wherein the plurality of partial residual blocks includes (i) a first partial residual block that is determined based on a difference between a first prediction block of the current block and the current block, and (ii)

a second partial residual block that is determined based on a difference between a first reconstruction block of the current block and the current block, the first reconstruction block being determined based on the first partial residual block.

3. The method of claim 1, wherein the determining the plurality of partial residual blocks further comprises:
entropy decoding the coded information of the plurality of partial residual blocks of the current block to obtain quantized transform coefficients associated with each of the plurality of partial residual blocks based on the respective coding parameters, the respective coding parameters including at least one of a binarization, a coefficient scanning order, and a context model of the respective partial residual block.

4. The method of claim 3, wherein the determining the plurality of partial residual blocks further comprises:
dequantizing the quantized transform coefficients associated with each of the plurality of partial residual blocks to obtain transform coefficients associated with the respective partial residual block based on the respective coding parameters, the respective coding parameters including a quantization step size of the respective partial residual block.

5. The method of claim 4, wherein a quantization step size of the quantized transform coefficients associated with at least one of the plurality of partial residual blocks is equal to 1.

6. The method of claim 4, wherein the determining the plurality of partial residual blocks further comprises:
inversely transforming the transform coefficients associated with each of the plurality of partial residual blocks to obtain the plurality of partial residual blocks based on the respective coding parameters that include respective transform kernels.

7. The method of claim 4, wherein the determining the plurality of partial residual blocks further comprises:
inversely transforming at least one of the plurality of partial residual blocks based on an identity transform.

8. The method of claim 1, wherein:
a size of a first partial residual block of the plurality of partial residual blocks is equal to the size of the current block, and
a size of a second partial residual block of the plurality of partial residual blocks is smaller than the size of the current block.

9. The method of claim 1, wherein:
at least one of the plurality of partial residual blocks is coded by the lossless coding mode, and
at most one of the plurality of partial residual blocks is coded by the lossy coding mode.

10. The method of claim 1, wherein the coded information further indicates a number of the plurality of partial residual blocks and which of the plurality of partial residual blocks is coded by the lossless coding mode.

11. The method of claim 1, further comprising:
determining a reference block for another block in the current picture, the reference block for the other block including reconstruction samples that are determined based on a subset of the plurality of partial residual blocks.

12. The method of claim 1, wherein the reconstructing the current block further comprises:
determining a first reconstruction block of the current block based on a first subset of the plurality of partial residual blocks that is coded by the lossy coding mode and the prediction block; and determining a second reconstruction block of the current block based on a second subset of the plurality of partial residual blocks that is coded by the lossless coding mode and the prediction block.

13. The method of claim 1, further comprising:

determining a first reference block for a first block in the current picture based on a first subset of the plurality of partial residual blocks and a second reference block for a second block in another picture based on a second subset of the plurality of partial residual blocks, the first subset of the plurality of partial residual blocks being different from the second subset of the plurality of partial residual blocks.

14. A method of video encoding, the method comprising:

determining a plurality of partial residual blocks of a current block, each of the plurality of partial residual blocks indicating a difference between a respective prediction block of the current block and the current block; and encoding the plurality of partial residual blocks of the current block into a bitstream based on respective coding parameters, wherein:

(i) a first one of the plurality of partial residual blocks is coded by a lossy coding mode, (ii) a size of at least one of the plurality of partial residual blocks is equal to a size of the current block, and (iii) when the plurality of partial residual blocks includes a partial residual block that is coded by a lossless coding mode, only the partial residual block of the plurality of partial residual blocks is coded by the lossless coding mode.

15. The method of claim 14, wherein the plurality of partial residual blocks includes (i) a first partial residual block that is determined based on a difference between a first prediction block of the current block and the current block, and (ii) a second partial residual block that is determined based on a difference between a first reconstruction block of the current block and the current block, the first reconstruction block being determined based on the first partial residual block.

16. The method of claim 14, wherein the encoding the plurality of partial residual blocks further comprises:

transforming each of the plurality of partial residual blocks to obtain a plurality of partial transform blocks based on respective transform kernels.

17. The method of claim 16, wherein the encoding the plurality of partial residual blocks further comprises:

quantizing each of the plurality of partial transform blocks based on respective quantization step sizes.

18. The method of claim 17, wherein a quantization step size of the respective quantization step sizes is equal to 1.

19. The method of claim 17, wherein the encoding the plurality of partial residual blocks further comprises:

entropy coding the plurality of quantized partial transform blocks of the current block based on respective entropy coding parameters, the respective entropy coding parameters including at least one of a binarization, a coefficient scanning order, and a context model of a respective one of the plurality of partial residual blocks.

20. A non-transitory computer-readable storage medium storing instructions which when executed by a processor cause the processor to perform an encoding method comprising:

determining a plurality of partial residual blocks of a current block, each of the plurality of partial residual blocks indicating a difference between a respective prediction block of the current block and the current block;

encoding the plurality of partial residual blocks of the current block into a bitstream based on respective coding parameters; and transmitting the encoded bitstream, wherein:

(i) a first one of the plurality of partial residual blocks is coded by a lossy coding mode, (ii) a size of at least one of the plurality of partial residual blocks is equal to a size of the current block, and (iii) when the plurality of partial residual blocks includes a partial residual block that is coded by a lossless coding mode, only the partial residual block of the plurality of partial residual blocks is coded by the lossless coding mode.

\* \* \* \* \*